US012525068B2

(12) United States Patent
Ross et al.

(10) Patent No.: US 12,525,068 B2
(45) Date of Patent: Jan. 13, 2026

(54) CLOUD COMPUTER FOR EXECUTING AT LEAST A PARTLY AUTOMATED DRIVING FUNCTION OF A MOTOR VEHICLE, AND METHOD FOR OPERATING A CLOUD COMPUTER

(71) Applicant: Robert Bosch GmbH, Stuttgart (DE)

(72) Inventors: Hans-Leo Ross, Lorsch (DE); Lucas Heil, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 17/896,400

(22) Filed: Aug. 26, 2022

(65) Prior Publication Data

US 2023/0076205 A1 Mar. 9, 2023

(30) Foreign Application Priority Data

Sep. 3, 2021 (DE) ...................... 10 2021 209 687.5

(51) Int. Cl.
*G07C 5/00* (2006.01)
*G07C 5/04* (2006.01)

(52) U.S. Cl.
CPC ............... *G07C 5/008* (2013.01); *G07C 5/04* (2013.01)

(58) Field of Classification Search
CPC .................................. G07C 5/008; G07C 5/04
USPC ......................................................... 701/419
See application file for complete search history.

(56) References Cited

U.S. PATENT DOCUMENTS

| 11,880,293 | B1 * | 1/2024 | Hendrix | G06F 11/362 |
| 2018/0085584 | A1 * | 3/2018 | Tascione | G05D 1/0276 |
| 2018/0233145 | A1 * | 8/2018 | Bathiche | G06V 40/23 |
| 2019/0011544 | A1 * | 1/2019 | Gassend | G01S 17/86 |
| 2020/0106542 | A1 * | 4/2020 | Liu | G06F 1/12 |
| 2021/0061306 | A1 * | 3/2021 | Dagan | H04W 4/40 |
| 2022/0123849 | A1 * | 4/2022 | McCall | H04J 3/0658 |
| 2023/0076205 | A1 * | 3/2023 | Ross | G07C 5/04 |

* cited by examiner

*Primary Examiner* — Tyler D Paige
(74) *Attorney, Agent, or Firm* — Norton Rose Fulbright US LLP (57) ABSTRACT

A cloud computer has an enclave including a monitoring module. The cloud computer receives data and transmits the data to the enclave for the execution of at least a partly automated driving function of a vehicle. The monitoring module checks whether transmitted data are received by the enclave at a basis clock rate, and releases data received by the enclave at the basic clock rate for use by the enclave. The cloud computer receives a cloud-computer-external time base, synchronizes a cloud-computer-internal time base with the cloud-computer-external time base, and transmits both the cloud-computer-external time base and the synchronized cloud-computer-internal time base to the enclave. The enclave compares the cloud-computer-external time base to the synchronized cloud-computer-internal time base at the basic clock rate, and, in the event of a time deviation below a specified threshold value, uses data received at the basic clock rate.

14 Claims, 5 Drawing Sheets

CLOUD COMPUTER FOR EXECUTING AT LEAST A PARTLY AUTOMATED DRIVING FUNCTION OF A MOTOR VEHICLE, AND METHOD FOR OPERATING A CLOUD COMPUTER

CROSS REFERENCE

The present application claims the benefit under 35 U.S.C. 119 of German Patent Application No. DE 10 2021 209 687.5 filed on Sep. 3, 2021, which is expressly incorporated herein by reference in its entirety.

FIELD

The present invention relates to a cloud computer for carrying out at least a partly automated driving function of a motor vehicle, to a method for operating a cloud computer, and to a computer program product for carrying out the method.

BACKGROUND INFORMATION

In current automation systems for motor vehicles, operational safety and information security are playing an ever more important role. However, measures pertaining to operational safety and information security are often in contradiction with each other in the known approaches. Moreover, such measures are often incompatible with other demands, e.g., demands regarding availability, performance and time demands, and real time demands, in particular. Especially in the configuration of controls using microcontrollers and microprocessors, it is essential to find a suitable compromise in the consideration of the mentioned quality demands. It is important in that context that data with regard to the correctness in a defined real-time interval are able to be processed in the cloud in a verifiable manner.

From the related art, it is known to shift at least parts of a control of traffic flows and/or individual automated motor vehicles to a cloud. A cloud in the context of this description should be understood as a grouping of virtualized hardware resources such as memory space and/or processing power and/or networks. A cloud is made available based on the Internet and allows for access to the virtualized hardware resources.

However, for such a purpose, a secure computer which is designed to take all of the mentioned quality demands into account must be available on the cloud. Current cloud systems such as the AZURE Cloud, and control mechanisms such as Kubernetes focus only on the aspect of information security and privacy. Even a systematic consideration of an authenticity of the underlying system is rarely supported by such mechanisms. If it is also intended to carry out dynamic processes and multiple control cascades on the cloud in a functionally secure manner, then data flows must also be dynamically protected under runtime conditions with the aid of different security mechanisms.

In general, cloud systems exhibit relatively high performance. However, they are regularly subject to fluctuations, for instance during switchovers via Kubernetes or when security algorithms have noticed a critical threat pattern. Known security mechanisms are able to identify such effects, but there are currently no known measures available for counteracting time fluctuations, fluctuations in performance, or availability fluctuations, for instance.

SUMMARY

It is an object of the present invention to provide a better cloud computer for executing at least a partly automated driving function of a motor vehicle, to provide a method for operating a cloud computer and a computer program product for carrying out the method. This object may be achieved by a cloud computer for the execution of at least a partly automated driving function of a motor vehicle, a method for operating a cloud computer, and a computer program product for carrying out the method, having the features of the present invention. Advantageous refinements and embodiment are disclosed herein.

According to an example embodiment of the present invention, a cloud computer for carrying out at least a partly automated driving function of a motor vehicle has an enclave including a monitoring module. The cloud computer is set up to receive data and to transmit the data to the enclave for the execution of at least a partly automated driving function of the motor vehicle. The monitoring module is developed to check whether data transmitted for the execution of at least a partly automated driving function of the motor vehicle are received by the enclave at a basic clock rate, and to release data received by the enclave at the basic clock rate for use by the enclave. The cloud computer is developed to receive a cloud-computer-external time base, to synchronize a cloud-computer-internal time base with the cloud-computer-external time base, and to transmit both the cloud-computer-external time base and the synchronized cloud-computer-internal time base to the enclave. The enclave is developed to compare the cloud-computer-external time base to the synchronized cloud-computer-internal time base at the basic clock rate, and in case of a time deviation below a specified threshold value, to use data received at the basic clock rate.

An enclave is understood as an isolated and trusted runtime environment (trusted execution environment, TEE). For instance, an enclave includes areas of a processor and a working memory that are reserved for the execution of defined program components. An enclave allows for the execution of a function that is executed in isolation by other functions of a system including the enclave. As a result, a security of an enclave is independent of a security of the system, i.e., the cloud computer in this instance. For example, an enclave is able to be set up with the aid of a software guard extension (SGx) which is an expansion of what is known as the x86 architecture.

The basic clock rate constitutes a heartbeat of the cloud computer, so to speak, which indicates whether function units of the cloud computer are still executed in a functionally secure manner and thus are capable of transmitting data to the enclave. The monitoring module may therefore also be called a heartbeat module. In an advantageous manner, the monitoring module is able to monitor the communication or a data transmission of data for executing the at least one automated driving function of the motor vehicle within the cloud computer, so that aspects of functional security in the cloud computer can be ensured and reconciled with one another. However, it is also possible to protect a communication with the motor vehicle on the basis of a heartbeat principle, which allows for the realization of an overall concept based on the heartbeat principle.

According to an example embodiment of the present invention, the cloud computer is based on the idea of transmitting data for the execution of the at least one partly automated driving function to the enclave in a timely fashion. In an advantageous manner, the cloud computer is thereby able to be used within the framework of a real-time control of a motor vehicle. The motor vehicle may also be referred to as an automated motor vehicle. A partly automated driving function within the framework of the entire description is meant to denote an assisted driving function, a partly automated driving function, a highly automated driving function, a fully automated driving function or an autonomous driving function.

One disadvantage of an enclave is that it is unable to provide a time base of its own, which means that an external, independent time base is required and has to be synchronized with a cloud-computer-internal time base. The enclave itself is furthermore unable to check a time base of its own for correctness because time bases in the enclave are unable to be securely checked by simple means with respect to a cloud-computer-external time base (e.g., a GPS time, etc.). Without further measures, a hacker could simulate an incorrect GPS time, for example. For these reasons, a time base must be conveyed to the enclave in a secure manner in order to satisfy real time demands, in particular. This is achieved by setting up the cloud computer for receiving a cloud-computer-external time base, for synchronizing a cloud-computer-internal time base with the cloud-computer-external time base, and for transmitting both the cloud-computer-external time base and the synchronized cloud-computer-internal time base to the enclave. The basic clock rate represents a time base for monitoring the time bases transmitted to the enclave.

The cloud-computer-external time base may be provided by any timing circuit system. For instance, the cloud-computer-external time base may be a GPS time base, a Galileo time base or a Glonass time base. The enclave may also be set up to receive a plurality of cloud-computer-external time bases and to check whether at least two received cloud-computer-external time bases agree with one another at least in a specified time period, and to compare one of the agreeing time bases to the synchronized cloud-computer-internal time base. In one embodiment, the cloud computer is set up to protect the transmission of a time base to the enclave with the aid of cryptographic measures.

This advantageously enables the cloud computer to satisfy defined demands with regard to functional security while different aspects of the functional security are able to be reconciled with one another. For example, there is the advantageous possibility of monitoring different error and deficiency events during the runtime, i.e., while the motor vehicle is in operation. For instance, error events such as a failure and functional errors are detectable. In addition, availability problems, for instance, are able to be remedied. I can be determined whether certain function units are functionally ready for operation, for example.

In one example embodiment of the present invention, the monitoring module is developed to provide the enclave with a process time base time based on the basic clock rate. The enclave is developed to compare the process time with the cloud-computer-external time base and/or with the synchronized cloud-computer-internal time base, and in the event of at least one time deviation below a specified threshold value, to use data received. In an advantageous manner, the process time base provides the enclave with a further time base. In the event of a developing time deviation between the process time and the cloud-computer-external time base and/or the synchronized cloud-computer-internal time base, an error may be inferred.

In one example embodiment of the present invention, the cloud computer has a further enclave including a further monitoring module. The cloud computer is developed to receive data from the motor vehicle and to transmit the data to the further enclave for the execution of at least a partly automated driving function of the motor vehicle. The further monitoring module is developed to check whether data are transmitted to the further enclave at the basic clock rate and to release data received by the further enclave at the basic clock rate for use by the further enclave. The cloud computer is developed to receive a further cloud-computer-external time base, to synchronize a further cloud-computer-internal time base with the further cloud-computer-external time base and to transmit both the further cloud-computer-external time base and the further synchronized cloud-computer-internal time base to the further enclave. The further enclave is developed to compare the further cloud-computer-external time base to the further synchronized cloud-computer-internal time base at the basic clock rate, and in the event of a time deviation below a specified threshold value, to use data received. In an advantageous manner, this makes it possible to separately operate different sections of the cloud computer in a secure and protected manner. The further enclave may also be developed as a redundant enclave. In this case, the redundant enclave is able to replace the enclave in an emergency situation, or vice versa.

In one example embodiment of the present invention, the further enclave is embodied as a redundant enclave of the enclave. The enclave and the redundant enclave are developed to exchange received time bases with one another and to compare them to one another, and in the event of at least one time deviation below a specified threshold value, to use data received in each case. In one embodiment, the further enclave is developed as a redundant enclave of the enclave. The enclave and the redundant enclave are set up for mutual monitoring. In an advantageous manner, this makes it possible to detect deviations in the function sequence of one of the enclaves when changes occur. For example, attacks, e.g., attacks in which falsified data and/or time bases were transmitted to one of the enclaves within the framework of an attack, are able to be identified in this way. In the event of a threatened enclave, emergency functions are able to be executed in a safe and risk-free manner. This makes it possible to still transfer systems to a secure and protected state even in a compromised state.

A monitoring module may advantageously be implemented in different areas of the cloud computer. In one example embodiment of the present invention, the cloud computer has an additional monitoring module. The additional monitoring module is part of a container-based processing unit of the cloud computer or of a partition of the cloud computer or of an additional enclave of the cloud computer. The additional monitoring module is developed to check whether data transmitted for the execution of at least a partly automated driving function of the motor vehicle are transmitted to the container-based processing unit or to the partition or to the additional enclave at the basic clock rate, and to release data received by the container-based processing unit or the partition or the additional enclave at the basic clock rate for use by the container-based processing unit or the partition or the additional enclave. It is also possible to provide multiple additional monitoring modules in the cloud computer. This advantageously makes it possible to provide a networked heartbeat mechanism in the cloud computer.

The container-based processing units of the cloud computer may be what is referred to as Kubernetes pods, for instance. Pods are the smallest usable units that are able to be set up and managed in Kubernetes, a cloud-based container platform. A pod is a group of one or more container(s) having jointly utilized memory and network resources and a specification for a development of the containers. A pod is dynamically expandable, e.g., with regard to a memory requirement or a processing performance.

The cloud computer may also have redundant container-based processing units. The redundant container-based processing units are able to be activated in synchrony within the framework of the execution of the partly automated driving function. This advantageously makes it possible to protect different function units such as safety-critical function units, in particular. The isolation of applications in partitions may be implemented with the aid of Dockers, for example.

In an advantageous manner, the mentioned mechanisms are able to be monitored for the decoupling or separating of function units. The enclave provides a secure runtime environment which is able to introduce a variety of test vectors into the security system, e.g., those that represent potential threats, so that performance tests, real time tests and error injection tests are able to be introduced, for example. Depending on the requirements, the heartbeat principle is adaptable to the respective architecture.

In one example embodiment of the present invention, the monitoring module or the additional monitoring module is set up as a higher-order monitoring module. The higher-order monitoring module is developed to check whether data transmitted by the container-based processing unit or the partition or the additional enclave to the enclave for the execution of at least a partly automated driving function are transmitted at the basic clock rate, and to release data received by the enclave at the basic clock rate for use by the enclave.

In one example embodiment of the present invention, the data for the execution of at least a partly automated driving function of the motor vehicle include useful data and monitoring data of the motor vehicle and/or of infrastructure elements and/or an of application software. The monitoring data include information pertaining to a quality of the useful data.

The useful data may include all data required for the control of the motor vehicle. For example, the useful data may include environment data of the at least [sic] motor vehicle that represent an environment of the motor vehicle and are able to be provided by at least one sensor device. However, the useful data, for instance, may also include parameters pertaining to the motor vehicle such as a current position of the motor vehicle and/or a current velocity of the motor vehicle, etc.

In one example embodiment of the present invention, the cloud computer is designed to operate at least one function unit in a lockstep operation. A lockstep is understood as a method for detecting errors in the (virtualized) hardware, which is typically used especially for processors and microcontrollers. A lockstep is characterized in that a plurality of identical or same-type units are used, e.g., CPU cores in multicore processors. In an advantageous manner, at least part of at least one container-based processing unit is thereby additionally functionally protected. For instance, an arithmetic logic unit, ALU, is protectable with the aid of a lockstep. As an alternative to a lockstep, for instance, it is also possible to use an asymmetrical redundancy featuring a comparator, the comparator possibly being implemented in the enclave, for instance.

According to an example embodiment of the present invention, a method for operating a cloud computer includes the following method steps. Data are received and transmitted to an enclave for the execution of at least a partly automated driving function of the motor vehicle. It is checked whether transmitted data are received by the enclave at a basic clock rate, and data received by the enclave at the basic clock rate are released for use by the enclave. A cloud-computer-external time base is received and synchronized with a cloud-computer-internal time base. The cloud-computer-external time base and the synchronized cloud-computer-internal time base are transmitted to the enclave. The cloud-computer-external time base is compared to the synchronized cloud-computer-internal time base at the basic clock rate. In the event of a time deviation below a specified threshold value, data received at the basic clock rate are used.

In one example embodiment of the present invention, data are received and transmitted to a further enclave for the execution of an at least partly automated driving function of the motor vehicle. It is checked whether transmitted data are received by the further enclave at a basic clock rate, and data received by the further enclave at the basic clock rate are released for use by the further enclave. A further cloud-computer-external time base is received and synchronized with a further cloud-computer-internal time base. The further cloud-computer-external time base and the further synchronized cloud-computer-internal time base are transmitted to the further enclave. The further cloud-computer-external time base is compared to the further synchronized cloud-computer-internal time base at the basic clock rate. In the case of a time deviation below a specified threshold value, data received at the basic clock rate are used.

In one example embodiment of the present invention, at least one further time base of a further enclave is received, received time bases are compared to one another, and in the event of at least one time deviation below a specified threshold value, received data are used. In one embodiment, the further enclave is developed as a redundant enclave of the enclave. The enclave is monitored with the aid of the redundant enclave. Mutual monitoring of the enclaves may also take place.

A computer program product includes instructions that when executed on a computer, induce the computer to carry out a method according to one of the disclosed embodiments of the present invention. The computer program product may be stored on a machine-readable memory medium, for instance.

In the following text, the present invention will be described in detail with further features and advantages based on schematic figures.

DETAILED DESCRIPTION OF EXAMPLE EMBODIMENTS

Figure 1:
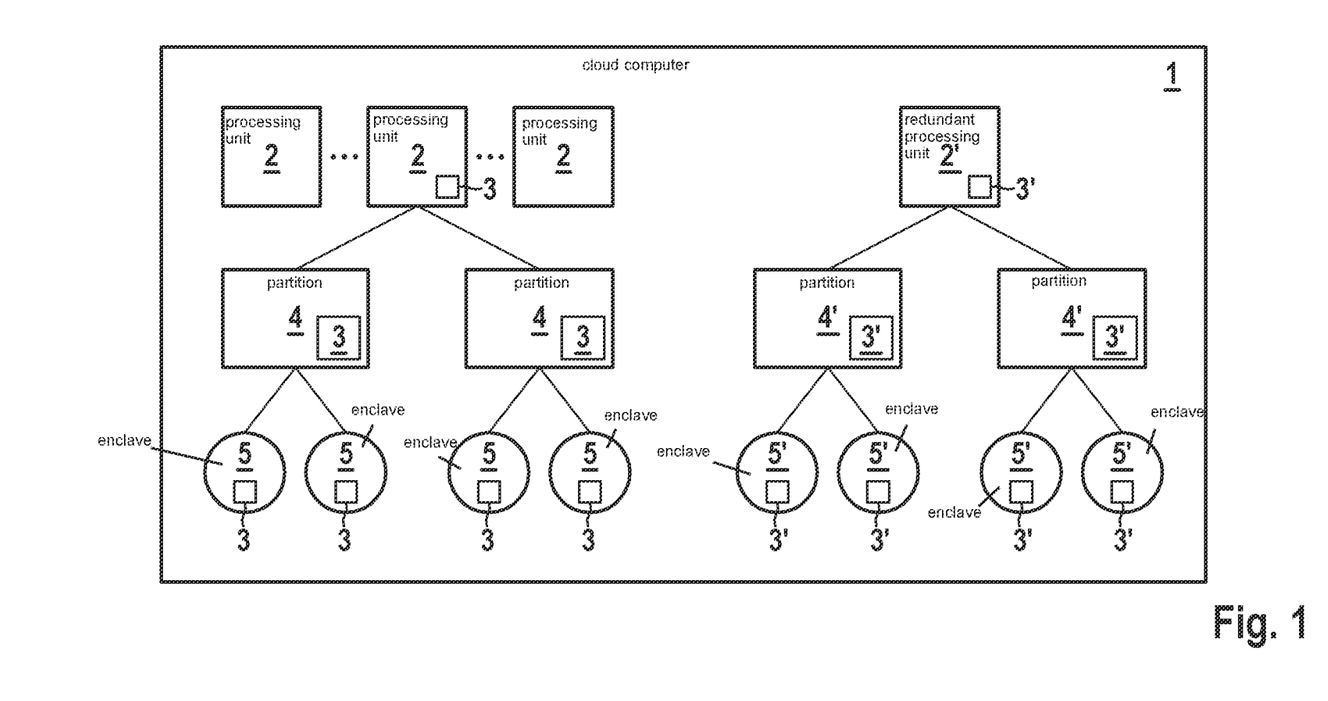
FIG. 1 shows a cloud computer, according to an example embodiment of the present invention.

FIG. 1 schematically illustrates a cloud computer 1. Cloud computer 1 is developed to execute at least a partly automated driving function of a motor vehicle. Cloud computer 1 is implemented in a cloud infrastructure. The motor vehicle may be any motor vehicle.

Cloud computer 1 has a plurality of container-based processing units 2. Container-based processing units 2, for example, may be provided for different driving functions of the motor vehicle. For instance, container-based processing units 2 may be Kubernetes pods. At least one container-based processing unit 2 is able to be subdivided into partitions 4. By way of example, FIG. 1 shows that a container-based processing unit 2 is subdivided into two partitions 4. A partitioning of container-based processing units 2 is not mandatory, however. As an alternative or in addition to container-based processing units 2, cloud computer 1 may also include other processing units 2.

Cloud computer 1 has at least one enclave 5 including a monitoring module 3. Merely by way of example, FIG. 1 shows that both partitions 4 of container-based processing unit 2 have two enclaves 5 in each case. However, enclaves 5 need not necessarily be set up within a partition 4. Monitoring module 3 is part of the at least one enclave 5. Monitoring module 3 is developed to check whether data transmitted for the execution of at least a partly automated driving function of the motor vehicle are transmitted to enclave 5 at a basic clock rate, and to release data received by enclave 5 at the basic clock rate for use by enclave 5.

Cloud computer 1 may also include additional monitoring modules 3. An additional monitoring module 3, for example, may be part of a container-based processing unit 2 of cloud computer 1 or of a partition 4 of cloud computer 1 or of an additional enclave 3 of cloud computer 1. Additional monitoring module 3 is developed to check whether data are transmitted at the basic clock rate to container-based processing unit 2 or to partition 4 or to additional enclave 5 for the execution of at least a partly automated driving function of the motor vehicle, and to release data received by container-based processing unit 2 or partition 4 of [sic; or] additional enclave 5 at the basic clock rate for use by container-based processing unit 2 or partition 4 or additional enclave 5. In this way, the cloud computer has a branching system of monitoring modules 3. They may also be developed for a mutual exchange of data.

Monitoring module 3 or an additional monitoring module 3 may be set up as a higher-order monitoring module, for example. In this case, remaining monitoring modules 3 may be developed as subordinate monitoring modules 3. The higher-order monitoring module may also be referred to as a master heartbeat. The higher-order monitoring module is designed to check whether data transmitted by container-based processing unit 2 or partition 4 or additional enclave 5 to enclave 5 are transmitted at the basic clock rate for the execution of at least a partly automated driving function, and to release data received by enclave 5 at the basic clock rate for use by enclave 5. However, additional monitoring modules 3 need not necessarily be developed as subordinate or higher-order monitoring modules 3. Additional monitoring modules 3 may also be omitted.

Cloud computer 1 may furthermore include redundant sections, which is also not a requirement. Both enclaves 5, partitions 4 and/or container-based processing units 2 may have a redundant development. By way of example, FIG. 1 shows two identically developed container-based processing units 2, 2'. A structure of redundant container-based processing unit 2' corresponds to a structure of container-based processing unit 2. When cloud computer 1 is in operation, redundant sections may be activated in synchrony so that partly automated driving functions are able to be carried out in a redundant fashion.

Figure 2:
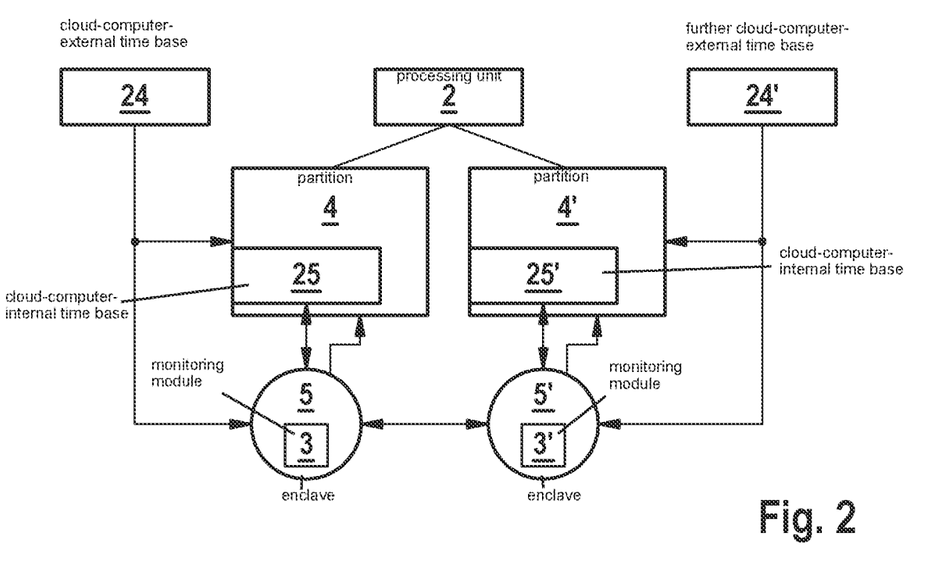
FIG. 2 shows the supply of a time base in an enclave, according to an example embodiment of the present invention.

FIG. 2 schematically illustrates the supply of a time base for two enclaves 5, 5', for example, of a partition 4, 4' in each case, which are part of a container-based processing unit 2 of cloud computer 1. Partition 4 and a further partition 4' may be developed as redundant partitions, for instance, but this is not a requirement. A further enclave 5', for example, is able to be developed as a redundant enclave 5' of enclaves 5, which is likewise not mandatory. An architecture shown in FIG. 2 of container-based processing unit 2 of cloud computer 1 may be used for a lockstep operation of partitions 4, 4', for instance. Architectures of container-based processing unit 2 other than that shown in FIG. 2 are also possible, however.

Cloud computer 1 is developed to receive a cloud-computer-external time base 24, to synchronize a cloud-computer-internal time base 25 with cloud-computer-external time base 24, and to transmit both cloud-computer-external time base 24 and the synchronized cloud-computer-internal time base to enclave 5. Enclave 5 is developed to compare cloud-computer-external time base 24 to the synchronized cloud-computer-internal time base at the basic clock rate, and in the event of a time deviation below a specified threshold value, to use data received at the basic clock rate. Because of the heartbeat principle, the basic clock rate is provided for time and performance monitoring, which constitutes a time base for an active execution of a control and data flow.

In the illustrated example of FIG. 2, cloud computer 1 is furthermore developed to receive data from the motor vehicle and to transmit the data to further enclave 5' for the execution of an at least partly automated driving function of the motor vehicle. Further monitoring module 3' of further enclave 5' is developed to check whether data are transmitted to further enclave 5' at the basic clock rate and to release data received by further enclave 5' at the basic clock rate for use by further enclave 5'.

Cloud computer 1 of FIG. 2 is developed to receive a further cloud-computer-external time base 24', to synchronize a further cloud-computer-internal time base 25' with further cloud-computer-external time base 24', and to transmit both further cloud-computer external time base 24' and the further synchronized cloud-computer-internal time base to further enclave 5'. Further enclave 5' is developed to compare further cloud-computer-external time base 24' to the further synchronized cloud-computer-internal time base at the basic clock rate, and in case of a time deviation below a specified threshold value, to use data received.

Monitoring module 3 may also be developed to provide a process time base to enclave 5 based on the basic clock rate. Enclave 5 is developed to compare the process time to the cloud-computer-external time base and/or to the synchronized cloud-computer-internal time base, and in the event of at least one time deviation below a specified threshold value, to use data received. However, the supply of the process time base and the comparison of the process time base to another time base is not mandatory.

Enclave 5 and further enclave 5' may be developed as redundant enclaves 5, 5'. In this case, enclave 5 and redundant enclave 5' can be developed to exchange received time bases with one another, and in the event of at least one time deviation below a specified threshold value, to use data received in each case. However, enclave 5 and redundant enclave 5' may also be developed to monitor each other, but this is not a requirement.

Cloud computer 1 may be developed to protect the transmission of a cloud-computer-external time base 24, 24' and/or the transmission of a synchronized cloud-computerinternal time base to enclaves 5, 5' with the aid of cryptographic measures so that a particularly secure time base is able to be made available to enclaves 5, 5'. Further enclave 5' and its further monitoring module 3' may also be omitted, however.

Figure 3:
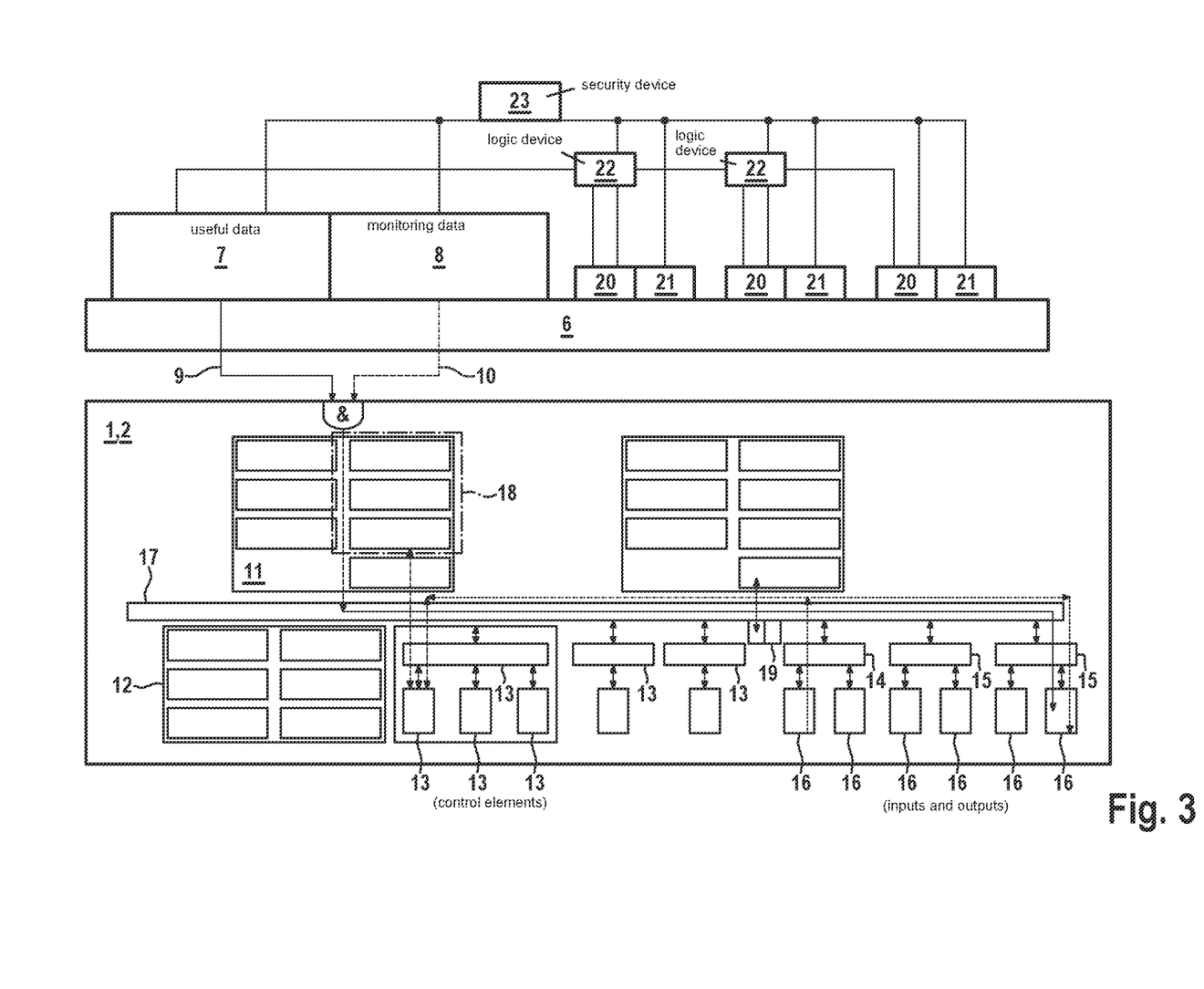
FIG. 3 shows the cloud computer of FIG. 1 in a more detailed view, a data flow to a motor vehicle and a data flow within the cloud computer being shown, according to an example embodiment of the present invention.

FIG. 3 schematically shows cloud computer 1 in a more detailed view. In addition, FIG. 3 indicates the motor vehicle by a real-time environment 6. FIG. 3 illustrates a data flow, i.e., a communication between function units of cloud computer 1. Monitoring module 3 or additional and/or further monitoring modules 3, 3' is/are not shown in FIG. 3 for the sake of simplicity.

Cloud computer 1 is developed to execute at least a partly automated driving function of the motor vehicle on the basis of received data. The data for executing an at least partly automated driving function of the motor vehicle, for example, may include useful data 7 and monitoring data 8 of the motor vehicle and/or of infrastructure elements and/or useful data 20 and monitoring data 21 of an application software, for example. Monitoring data 8, 21 include information about a quality of useful data 7, 20. For instance, useful data 7 may include different sensor data. In this case, monitoring data 8 may include data indicating whether sensor data from different but similar or equivalent sensor devices are in essential agreement with one another. For example, useful data 7 may include camera data and LiDAR data (light detection and ranging), which represent an environment of the motor vehicle. In such a case, monitoring data 8 may include information to the effect that an object was detected by a camera but not by a LiDAR device, for example. As shown in FIG. 3, monitoring data 8, 21 and useful data 7, 20 are able to be received by cloud computer 1 via separate channels and provided to function units of cloud computer 1 on separate channels, but this is not a requirement.

Useful data 7 may include application useful data 20, and monitoring data 8 may include application monitoring data 21 of at least one application software. Application useful data 20 of a plurality of software parts and/or a plurality of software may initially be preprocessed by at least one logic device 22 before the data are transmitted to cloud computer 1. The application useful data 20 and application monitoring data 21 may also be monitored by at least one security device 23. Known monitoring measures for the monitoring of software can be used for this purpose.

By way of example, FIG. 3 shows groups 11, 12 of function units of an exemplary cloud computer 1, the function units typically representing elements of a microcontroller. However, cloud computer 1 may also have fewer or more function units than those shown in FIG. 3, which may also be connected to one another in a manner that differs from FIG. 3.

A first group 11, for example, may include a program counter, an instruction register, a status register, other registers, an instruction decoder, a stack pointer and an ALU. A second group 12, for instance, may include an interrupt unit, a watchdog, a quartz, a timer, a counter and a multiplexer. In addition, various control elements 13 (controllers), memories 14, e.g., a working memory, a non-volatile memory (erasable programmable read only memory, EPROM) are provided on cloud computer 1 by way of example. Furthermore, but also simply by way of example, an analog-to-digital converter 14, ports 15, and inputs and various output 16 are provided. An exchange of data between the function units may be at least partly implemented via an internal data bus 17, for instance.

For example, the function units shown in FIG. 3 may be components of a container-based processing unit 2. Partitions 4 and/or enclaves 5 may be present within this container-based processing unit 2. The entire communication or data exchange within cloud computer 1 is implemented according to the heartbeat principle in combination with a supply of a secure time base to an enclave 5 of cloud computer 1. To this end, if required, monitoring units 3 may be implemented, which ensure that cloud computer 1 and/or container-based processing units 2 and/or partitions 4 and/or enclaves 5 cyclically receive(s) useful data 7 and monitoring data 8 required for executing an at least partly automated driving function.

For additional protection, at least part of at least one container-based processing unit 2 is able to be monitored with the aid of lockstep 18, which is sketched in FIG. 3 by way of example for a total of three function units. This makes it possible to execute particularly critical functions at a functional level in an especially secure manner. Different aspects of functional security can be properly taken into account in this way. For a lockstep 18, cloud computer 1 may have a two-channel port 19 for separating critical functions which are to be executed in the lockstep operation, and the particular functions which are meant to be carried out in the usual operation.

Figure 4:
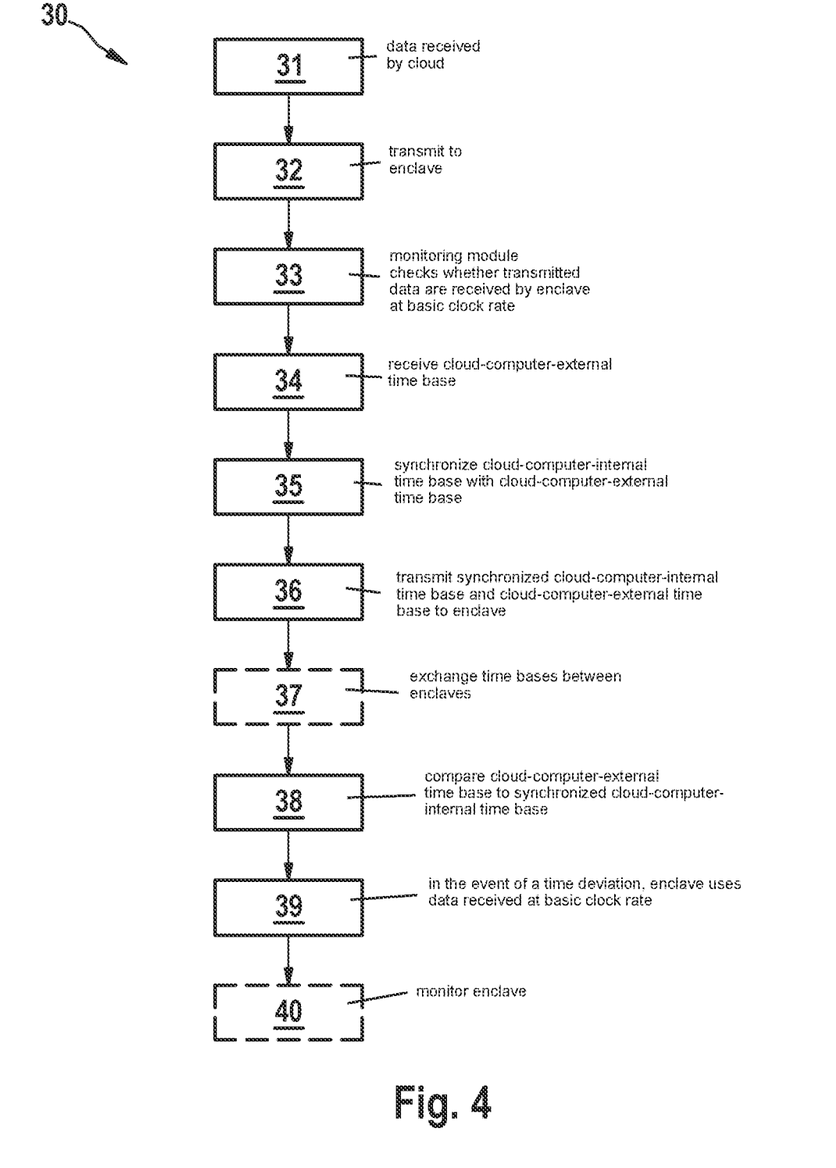
FIG. 4 shows a method for operating a cloud computer, according to an example embodiment of the present invention.

FIG. 4 schematically shows method steps 31, 32, 33, 34, 35, 36, 37, 38, 39, 40 of a method 30 for operating a cloud computer 1.

In a first method step 31, data are received by cloud computer 1. In a second method step 32, the received data are transmitted to enclave 5 for the execution of an at least partly automated driving function of motor vehicle 6. In a third method step 33, monitoring module 3 checks whether transmitted data are received by enclave 5 at a basic clock rate, and data received by enclave 5 at the basis clock rate are released by monitoring module 3 for use by enclave 5.

In a fourth method step 34, a cloud-computer-external time base 24 is received. In a fifth method step 35, a cloud-computer-internal time base 25 is synchronized with cloud-computer external time base 24. In a sixth method step 36, cloud-computer-external time base 24 and the synchronized cloud-computer-internal time base are transmitted to enclave 5. In an optional seventh method step 37, time bases 24, 24' are able to be exchanged between enclaves 5, 5'. In an eighth method step 38, cloud-computer-external time base 24 is compared at the basic clock rate to the synchronized cloud-computer-internal time base. In the process, it is also possible to compare time bases exchanged within the framework of optional seventh method step 37 with one another. In a ninth method step 39, in the event of a time deviation below a specified threshold value, enclave 5 uses data received at a basic clock rate.

In first method step 31, data are additionally able to be received by cloud computer 1 and transmitted to further enclave 5' in second method step 32 for the execution of an at least partly automated driving function of motor vehicle 6. In third method step 33, further monitoring module 3' of further enclave 5' may additionally check whether transmitted data are received by further enclave 5' at a basic clock rate, and data received by further enclave 5' at the basic clock rate are able to be released by further monitoring module 3' for use by further enclave 5'.

In fourth method step 34, a further cloud-computer-external time base 24' is able to be received in addition. In fifth method step 35, it is possible to additionally synchronize a further cloud-computer-internal time base 25' with further cloud-computer external time base 24'. In sixth method step 36, further cloud-computer-external time base 24' and the synchronized cloud-computer-internal time base are able to be transmitted to further enclave 5' in addition. In optional seventh method step 37, time bases 24, 24' can be exchanged between enclaves 5, 5'. In eighth method step 38, cloud-computer-external time base 24' is additionally able to be compared to the synchronized cloud-computer internal time base at the basic clock rate. In the process, time bases exchanged within the framework of optional seventh method step 37 are also able to be compared with one another. In ninth method step 39, in the event of a time deviation below a specified threshold value, data received at the basic clock rate are able to be used by further enclave 5'.

In an optional tenth method step 40, monitoring of enclave 5 may take place with the aid of redundant enclave 5. As an alternative or in addition, monitoring of redundant enclave 5' with the aid of enclave 5 is also able to be carried out.

Figure 5:
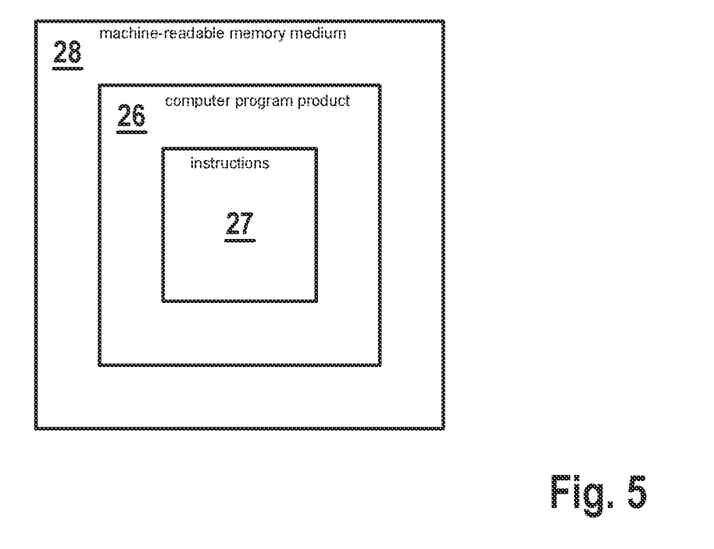
FIG. 5 shows a computer program product for executing the method, according to an example embodiment of the present invention.

FIG. 5 schematically shows a computer program product 26, which includes instructions 27 that when executed on a computer, induce the computer to carry out a method 30 according to one of the described embodiments. Computer program product 26, for instance, may be stored on a machine-readable memory medium 28.

What is claimed is:

1. A cloud computer for carrying out at least a partly automated driving function of a motor vehicle, comprising:
    an enclave including a monitor,
    the cloud computer being configured to receive data and to transmit the data to the enclave for the execution of at least a partly automated driving function of the motor vehicle;
    the monitor being configured to check whether the data transmitted for the execution of the at least a partly automated driving function of the motor vehicle are received by the enclave at a basic clock rate, and to release the data received by the enclave at the basic clock rate for use by the enclave;
    the cloud computer is configured to receive a cloud-computer-external time base, to synchronize a cloud-computer-internal time base with the cloud-computer-external time base, and to transmit both the cloud-computer-external time base and the synchronized cloud-computer-internal time base to the enclave;
    the enclave is configured to compare the cloud-computer-external time base to the synchronized cloud-computer-internal time base at the basic clock rate, and in the event of a time deviation below a specified threshold value, to use data received at the basic clock rate; and
    a further enclave, wherein the further enclave is a redundant enclave of the enclave, and the enclave and the redundant enclave are configured to exchange received time bases with one another and to compare them to one another, and in the event of at least one time deviation below the specified threshold, to use data received in each case,
    wherein the enclave is further configured to receive a plurality of cloud-computer-external time bases and to check whether at least two of the cloud-computer-external time bases agree with one another over a specified time period, and to compare one of the agreeing time bases to the synchronized cloud-computer-internal time base.

2. The cloud computer as recited in claim 1, wherein the monitor is configured to supply a process time base based on the basic clock rate to the enclave, and the enclave is configured to compare the process time to the cloud-computer-external time base and/or to the synchronized cloud-computer-internal time base, and in the event of at least one time deviation below the specified threshold value, to use data received.

3. The cloud computer as recited in claim 1, further comprising a further enclave including a further monitor, wherein the cloud computer is configured to receive data from the motor vehicle and to transmit the data to the further enclave for the execution of at least a partly automated driving function of the motor vehicle, the further monitor being configured to check whether data are transmitted to the further enclave at the basic clock rate, and to release data received by the further enclave at the basic clock rate for use by the further enclave, the cloud computer being configured to receive a further cloud-computer-external time base, to synchronize a further cloud-computer-internal time base with the further cloud-computer-external time base, and to transmit both the further cloud-computer-external time base and the further synchronized cloud-computer-internal time base to the further enclave, the further enclave being configured to compare the further cloud-computer-external time base to the further synchronized cloud-computer-internal time base at the basic clock rate, and in the event of a time deviation below the specified threshold value, to use data received.

4. The cloud computer as recited in claim 3, wherein the enclave and the redundant enclave are configured for mutual monitoring.

5. The cloud computer as recited in claim 1, wherein the cloud computer is configured to protect transmission of a time base to the enclave with using cryptographic measures.

6. The could computer as recited in claim 1, further comprising an additional monitor, the additional monitor being part of a container-based processing unit of the cloud computer or part of a partition of the cloud computer or part of an additional enclave of the cloud computer, the additional monitor being configured to check whether data transmitted for the execution of the at least a partly automated driving function of the motor vehicle are transmitted to the container-based processing unit or to the partition or to the additional enclave, at the basic clock rate, and to release data received at the basic clock rate by the container-based processing unit or the partition or the additional enclave, for use by the container-based processing unit or the partition or the additional enclave.

7. The cloud computer as recited in claim 6, wherein the monitor or the additional monitor is a higher-order monitor, and the higher-order monitor is configured to check whether data transmitted to the enclave by the container-based processing unit or the partition or the additional enclave for the execution of the at least a partly automated driving function of the motor vehicle, are transmitted at the basic clock rate, and to release data received by the enclave at the basic clock rate for use by the enclave.

8. The cloud computer as recited in claim 1, wherein data for the execution of the at least a partly automated driving function of the motor vehicle include useful data and monitoring data of: (i) the motor vehicle and/or (ii) infrastructure elements and/or (iii) an application software, the monitoring data including information about a quality of the useful data.

9. The cloud computer as recited in claim 1, wherein the cloud computer is configured to operate at least one function unit in a lockstep operation.

10. A method for operating a cloud computer, the method comprising the following steps:
    receiving data;

transmitting the received data to an enclave and to a further enclave for the execution of at least a partly automated driving function of a motor vehicle;

checking whether the transmitted data are received by the enclave at a basic clock rate, and releasing the data received by the enclave at the basic clock rate for use by the enclave;

receiving a cloud-computer-external time base;

synchronizing a cloud-computer-internal time base with the cloud-computer-external time base;

transmitting the cloud-computer-external time base and the synchronized cloud-computer-internal time base to the enclave;

comparing the cloud-computer-external time base to the synchronized cloud-computer-internal time base at the basic clock rate;

in the event of a time deviation below a specified threshold value, using the data received at the basic clock rate, receiving data;

wherein the further enclave is a redundant enclave of the enclave, and the enclave and the redundant enclave are configured to exchange received time bases with one another and to compare them to one another, and in the event of at least one time deviation below the specified threshold, to use data received in each case, wherein the enclave is further configured to receive a plurality of cloud-computer-external time bases and to check whether at least two of the cloud-computer-external time bases agree with one another over a specified time period, and to compare one of the agreeing time bases to the synchronized cloud-computer-internal time base.

11. The method as recited in claim 10, further comprising the following steps:

checking whether the transmitted data are received by the further enclave at the basic clock rate, and releasing data received by the further enclave at the basic clock rate for use by the further enclave;

receiving a further cloud-computer-external time base;

synchronizing a further cloud-computer-internal time base with the further cloud-computer-external time base;

transmitting the further cloud-computer-external time base and the further synchronized cloud-computer-internal time base to the further enclave;

comparing the further cloud-computer-external time base to the synchronized cloud-computer-internal time base at the basic clock rate; and in the event of a time deviation below a specified threshold value, using the data received at the basic clock rate.

12. The method as recited in claim 11, further comprising the following step:

receiving at least one further time base of the further enclave, comparing received time bases, and in the event of at least one time deviation below a specified threshold value, using the received data.

13. The method as recited in claim 10, wherein the method further comprises the following step:

monitoring the enclave using the redundant enclave.

14. A non-transitory computer-readable medium on which is stored a computer program including instructions for operating a cloud computer, the computer program, when executed by a computer, causing the computer to perform the following steps:

receiving data;

transmitting the received data to an enclave and to a further enclave for the execution of at least a partly automated driving function of a motor vehicle;

checking whether the transmitted data are received by the enclave at a basic clock rate, and releasing the data received by the enclave at the basic clock rate for use by the enclave;

receiving a cloud-computer-external time base;

synchronizing a cloud-computer-internal time base with the cloud-computer-external time base;

transmitting the cloud-computer-external time base and the synchronized cloud-computer-internal time base to the enclave;

comparing the cloud-computer-external time base to the synchronized cloud-computer-internal time base at the basic clock rate;

in the event of a time deviation below a specified threshold value, using the data received at the basic clock rate, wherein the further enclave is a redundant enclave of the enclave, and the enclave and the redundant enclave are configured to exchange received time bases with one another and to compare them to one another, and in the event of at least one time deviation below the specified threshold, to use data received in each case, wherein the enclave is further configured to receive a plurality of cloud-computer-external time bases and to check whether at least two of the cloud-computer-external time bases agree with one another over a specified time period, and to compare one of the agreeing time bases to the synchronized cloud-computer-internal time base.

* * * * *